Figure 1:
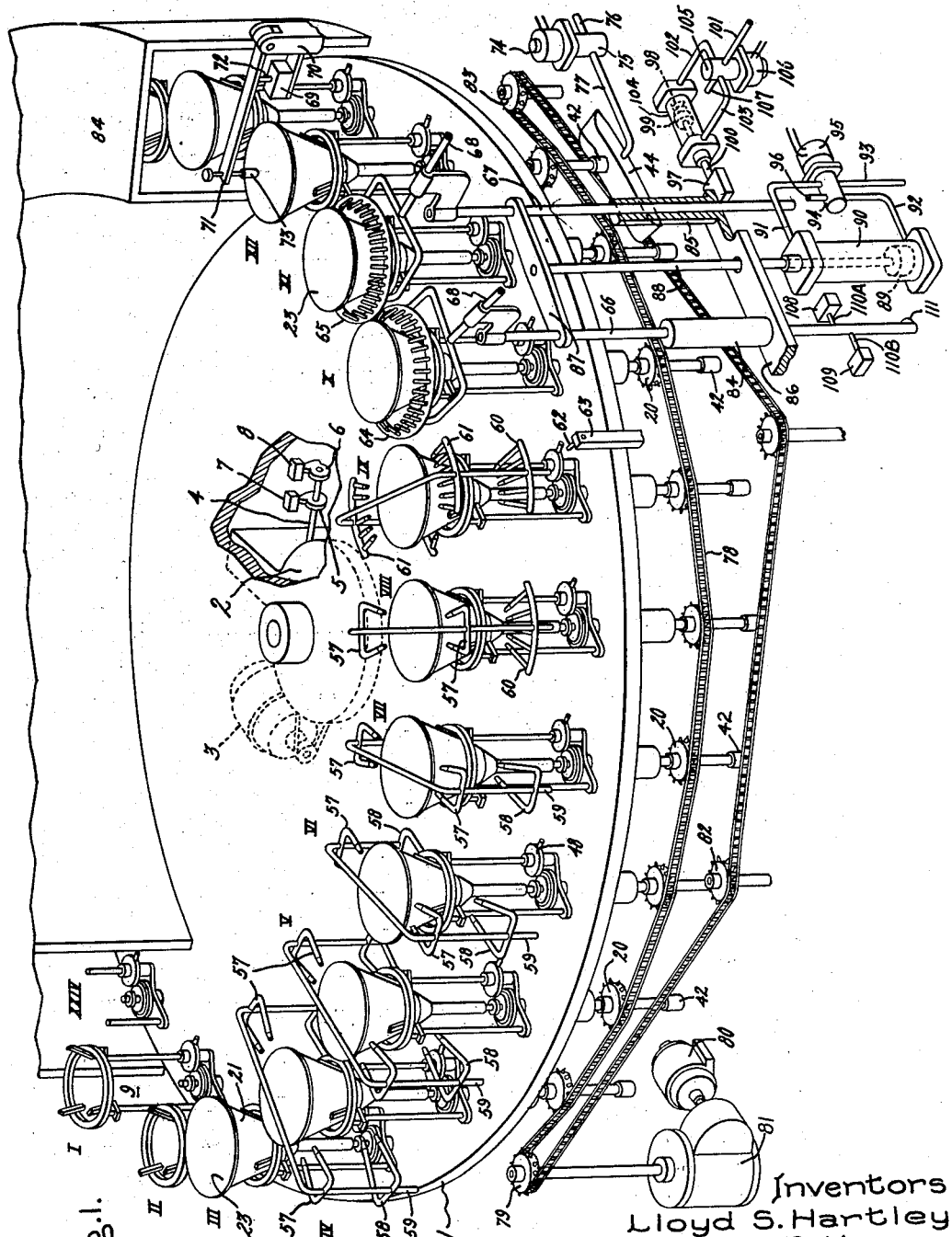

June 10, 1958  L. S. HARTLEY ET AL  2,837,870
APPARATUS FOR MAKING TUBE ENVELOPES
Filed June 24, 1950  3 Sheets-Sheet 1

Inventors:
Lloyd S. Hartley,
Joseph B. Henry,
John W. Miller,
William E. Shahan,
by *Merlon D Masse*
Their Attorney.

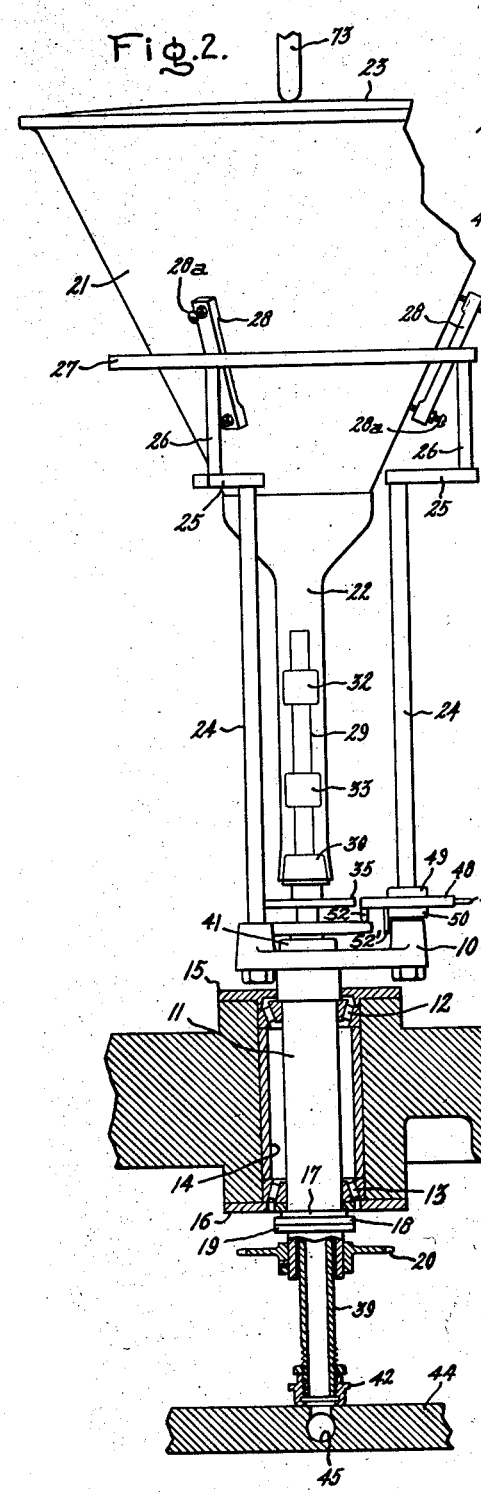

June 10, 1958     L. S. HARTLEY ET AL     2,837,870
APPARATUS FOR MAKING TUBE ENVELOPES
Filed June 24, 1950                               3 Sheets-Sheet 3

Inventors:
Lloyd S. Hartley,
Joseph B. Henry,
John W. Miller,
William E. Shahan,
by *Merton D. Munn*
Their Attorney.

United States Patent Office 2,837,870
Patented June 10, 1958

2,837,870

APPARATUS FOR MAKING TUBE ENVELOPES

Lloyd S. Hartley, Schenectady, Joseph B. Henry, Scotia, and John W. Miller and William E. Shahan, Schenectady, N. Y., assignors to General Electric Company, a corporation of New York Application June 24, 1950, Serial No. 170,202

13 Claims. (Cl. 49—2)

Our invention relates to the art of making glass to metal seals and more particularly to improved apparatus for fabricating metal type cathode ray tube envelopes.

Cathode ray tubes of the type employing a frusto conical metal member having a glass face plate sealed to the larger end and a neck including a flare or funnel sealed to the smaller end have come into extensive commercial use. The fabrication of these parts has in the past been accomplished on two separate machines and has involved the making of one seal after the other has been completed and the assembly cooled down. This method has required a preheating of the metal member for making of the second seal after the first seal has been completed and has resulted in considerable shrinkage. The two separate sealing operations and attendant handling of the parts and subassemblies has made the fabrication of the envelopes rather expensive and time consuming.

The present invention involves the concept of making the seals in close succession without a cooling period in between and the provision of a number of novel structural features embodied in apparatus for effecting automatically the complete fabrication on an envelope of the above type as the parts, and later the assembly, are moved from one position to another.

In accordance with a preferred embodiment of the invention the fabrication is carried out on a rotary machine of the type that is provided with a plurality of work supports or heads which are moved intermittently to occupy in succession a plurality of cooperative positions with respect to stationary equipment or work stations so that the parts are subjected to predetermined fabricating operations in each of the successively located stations. The work holders or heads provide for supporting the parts in the desired position or relationship and for adjusting the glass neck with respect to the metal cone to compensate for variations in the dimensions of the parts. The heads are also provided with means for subjecting the glass to a predetermined amount of push-up during the sealing operation and after the seal is largely made the vertical force is removed from the neck to allow the same amount of pull-down by the action of gravity on the weight of the glass neck. The face plate seals are accomplished by ring burners which are raised from the envelopes carried by the machine when the machine is moved and are lowered into position automatically after each movement of the machine. After the face plates are sealed, their final position is accurately determined by admitting air under pressure to the interior of the bulb and controlling the admission of air in accordance with the position of the face plate. After both seals have secured sufficient rigidity to hold the dimensions of the envelope, the heads continue through an annealing oven to the final position where the fabricated envelope is removed. In order to insure uniform heating of the metal cones during the preheating and sealing operation each of the heads is rotated about its own axis relative to the rotary part of the machine.

It is an object of our invention to provide a new and improved automatic machine for fabricating metal type cathode ray tube envelopes.

It is a further object of our invention to provide a new and improved apparatus for sealing a plurality of glass members to a single metal member.

It is a still further object of our invention to provide a new and improved apparatus for sealing the glass neck to the metal cone of a cathode ray tube envelope.

It is still another object of our invention to provide improved apparatus for sealing a glass face plate to a metal cathode ray tube envelope.

Figure 6:
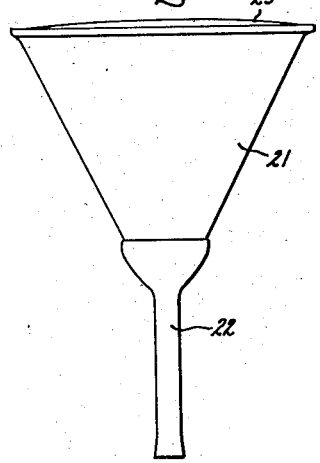
Figure 5:
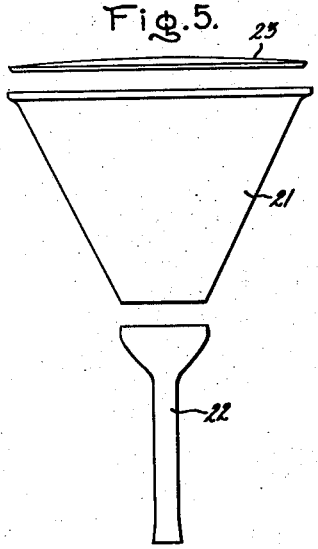
Figure 7:
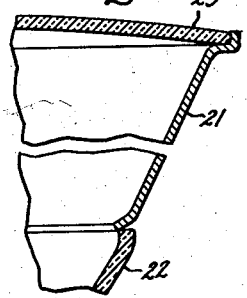
Figure 8:
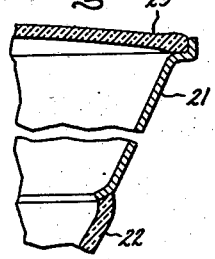
Figure 9:
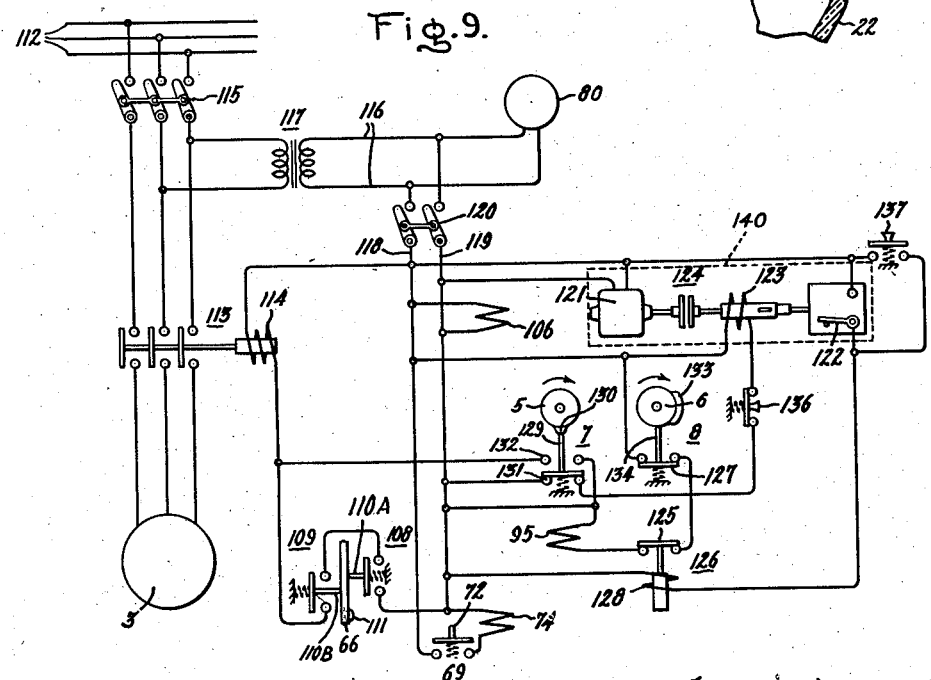

Further objects and advantages of our invention will become apparent as the following description proceeds, reference being had to the accompanying drawing and its scope will be pointed out in the appended claims. In the drawing, Fig. 1 is a perspective view, partially broken away of a rotary type machine embodying our invention; Fig. 2 is an elevational view partially in section and partially broken away illustrating one of the heads or work holders of the machine of Fig. 1; Fig. 3 is an enlarged view in section of a portion of Fig. 2; Fig. 4 is a perspective view of a detail part of Fig. 3; Fig. 5 is an exploded view showing the components of a metal envelope cathode ray tube; Fig. 6 is an elevational view of the completed envelope; Fig. 7 is an elevational view in section of a portion of the device of Fig. 6 prior to the actual sealing; Fig. 8 is a similar view showing the parts after the seals have been made and Fig. 9 is a schematic diagram of the electrical control system for the apparatus of Fig. 1.

Referring now to Fig. 1 of the drawing, we have shown our invention embodied in a rotary type of machine including a table 1 which is mounted for rotation on a suitable stationary support or pedestal 2. The table, as is well understood by those skilled in the art, is moved intermittently by a suitable intermittent drive mechanism housed within the stationary support 2 and driven by an electric motor 3, the energization of which is controlled in accordance with the control circuit illustrated schematically in Fig. 9 which will be described in detail at a later point in the specification. In order to affect certain control operations in accordance with the operation of the indexing mechanism, there is provided a shaft 4 extending into the housing of the drive mechanism and coupled thereto to make one revolution for each complete operation of the indexing mechanism. The shaft 4 operates a pair of cams 5 and 6 which in turn control respectively a pair of micro switches 7 and 8.

The rotary table 1 carries a number of work holders or heads 9 corresponding to the number of different stationary work positions or work stations which in the illustrated embodiment is twenty-four. These stations have been designated by numerals I to XXIV inclusive; only stations I to XII and XXIV are visible in the drawing. Before describing the stationary apparatus located at each of the work stations, it is believed desirable to describe in detail the work holder or head 9 which is duplicated at each of 24 equally spaced positions around the periphery of the table 1. This construction is illustrated in Figs. 2, 3 and 4 and the components of the envelope in different stages of completion are shown in Figs. 5 to 8 inclusive. The main support for the work is provided by a yoke member 10 having a downwardly extending tubular portion 11 journalled in suitable roller bearings 12 and 13 which are received within an opening extending through the support 1 and retained therein in spaced relation by a suitable spacing sleeve 14 and end plates 15 and 16. The plates 15 and 16 may be secured by a suitable fastening means (not shown). The yoke 10 is retained in position by a suitable spacing collar 17 and a pair of nuts 18 and 19 engaging a threaded portion of the member 11. A sprocket 20 for rotating the yoke 10 is secured in fixed relation to the lower end of the tubular extension 11.

The yoke 10 provides a support for the metal cone 21 of the cathode ray tube envelope to be fabricated. As illustrated in Figs. 5 and 6, the envelope also includes a neck or funnel 22 and a face plate 23. The support includes a plurality of vertically extending support rods 24 secured to the yoke and provided at their upper ends with spreaders 25, vertical spacers 26 and a supporting ring or collar 27. Secured to the inside of the collar are plurality of supporting fingers 28 which extend generally in the direction of the outer surface of the metal cone 21. Suitable adjusting screws 28a are provided for accommodating and centering the metal cone.

A glass neck or funnel 22 is mounted in co-operative relationship with respect to the cone 21 on a hollow supporting post 29 which extends upwardly into the funnel 22 and which is movable in a vertical direction relative to the yoke 10. The glass neck 22 is supported on the hollow post 29 by means of a frusto conical collar 30 preferably formed of refractory insulating material. The collar is secured in fixed relation to the support 29 by a suitable set screw 31. Spacing rings 32 and 33 are also provided on support 29 for centering the glass neck 22. The hollow support 29 is supported in vertically adjustable relation with respect to a sleeve 34 by means of an adjusting screw 35 which bears against the lower surface of the supporting collar 30 and threadingly engages the upper end of the sleeve 34. The sleeve 34 and with it the hollow support 29 are biased in an upward direction by means of a compression spring 37 interposed between the lower end of the sleeve 34 and a flanged spring retainer 38 secured against a shoulder in a sleeve 39 and provided with an upwardly extending guide portion 40 received within the lower end of the sleeve 34. The sleeve 39 extends to the upper side of the yoke 10 and terminates in a shoulder 41 which bears against the yoke. The sleeve 34 and the weight of the parts supported from it are supported by the compression spring 37.

The lower end of the tubular member 39 is provided with a suitable apertured cap 42 which as will be described in more detail at a later point in the specification slides over the upper surface of an air supply track 44 which forms a part of the work station XII and in the position corresponding to this work station, the lower end of the apertured cap 42 registers with an air supply passage 45 provided in the member 44.

As clearly shown in Fig. 3 a controlled amount of movement of the support 29 under the action of the compression spring 37 is provided by the cam surface 46 on the cam member 47 which is secured in fixed relation to the upper end of the sleeve 34. The position of the cam member 47 with respect to the support for the metal cone 21 is determined by the position of a cam follower member 48 which is secured to one of the support rods 24 by means of spacing collars 49 and 50. As shown in Figure 4, the cam actuator 48 is free to rotate relative to the support 24 and may be actuated by hand in making the initial adjustment and is automatically operated in station 9 by means of an extension 51. The cam actuator 48 is provided with a suitable extending cam actuating surface 52 which engages the cam surface 46. It will be apparent that as the member 48 is rotated the surface 52 may move to a shorter radius on the cam member 47 and depress the cam member and with it the support 29 against the action of the spring 37. As the cam actuating surface 52 moves to a longer radius the support 29 and with it the glass neck 22 is free to move upwardly under the action of the spring 37. Suitable pins 52' extend from the lower surface of the cam actuator 48 and engage the edge of the cam 47 in the extreme position of the cam actuator to limit its movement.

In order that the parts of the work head may rotate together but be free for the desired vertical movement suitable splines are provided. For example the sleeve 34 is splined to the hollow support 29 by means of a keyway 53 and a cooperating setscrew 54. Likewise, the yoke 10 and the hollow tubular member 39 are splined together by the keyway 55 and the key 56.

Before considering the operation of the illustrated embodiment of my invention, it is believed desirable to consider briefly stationary apparatus associated with the various work stations occupied by the movable heads of the machine as the machine is indexed from one position to another. As previously indicated these stations are designated by numerals I to XXIV inclusive. At stations IV to VII inclusive the metal cone is preheated. To this end, each of these stations is provided with a plurality of gas burner nozzles directed generally inwardly toward the upper and lower edges of the metal cone 21. The burner nozzles, represented somewhat diagrammatically and designated by numerals 57 and 58, are supported from suitable supply conduits 59 which may be supported in any suitable manner, such as directly from a gas supply main (not shown). The burner nozzles are spaced sufficiently away from the work and work holders 9 so that the table may be indexed without any interference from the burner nozzles. Additionally, as seen in Fig. 1 only four gas nozzles are located in each of the upper and lower positions at stations IV to VII. Thus, the preheating of the upper and lower edges of the cones involves heating to a relatively low temperature. However, it will be seen from the foregoing and Fig. 1 that the direct application of such heat enables control of the heating of the upper and lower edges of cone. At work station VIII the upper burner nozzles 57 remain the same as those illustrated in connection with stations IV to VII inclusive and the relatively low preheating of the upper edges of the cones continues but a sealing burner 60 including more nozzles and thus effective for substantially increasing the heat directed to the lower end of a cone is provided for effecting the lower or funnel seal. The sealing operation is started on this lower seal at station VIII. At station IX the sealing of the lower seal is continued and the preheating of the cone at the upper edge preparatory to make the face plate seal is increased. To this end the burner heads 61 are provided at station IX for increasing the heating of the upper edge of the metal cone 21 and sealing burners 60 are provided for the lower seal. At station IX there is also provided a stop member 62 which co-operates with the extension 51 of the cam actuator 48 to remove the upward pressure on the neck 22 of the tube envelope as will be described in more detail at a later point in the specification. The stop 62 is carried on a suitable fixed support illustrated at 63.

At stations X and XI, the face plate seal is accomplished. At these stations the upper edge of the metal cone 31 is heated by ring burners 64 and 65 which are supported from vertically movable support rods 66 and 67. The burners are supported by means of laterally extending supply conduits 68 which are suitably connected with a supply of gas by means of flexible conduits (not shown). It will be readily appreciated that it is necessary to raise the ring burners 64 and 65 when the movable part of the machine is to be indexed in order to prevent interference with the tube envelopes positioned in the heads 9. The control and operating system for effecting this movement in correlated relation with respect to the indexing of the machine will be described in detail at a later point of the specification. The face plate seal is completed at station XI and at this time the edge of the face plate is quite soft and the face plate tends to sag. When the tube envelope reaches the station XII the face plate is maintained in a predetermined position by admitting air under pressure to the interior of the envelope under the control of a position responsive electric switch 69. As illustrated in the drawing, the electric switch 69 is mounted from a fixed support 70 in cooperative relationship with a pivoted arm 71 also carried at the upper end of the fixed support 70 and extending over an operating arm 72 of the switch 69 and terminating in an adjustable stop member 73 which engages the central portion of the face plate 23 of a tube envelope.

As will be described in detail in connection with Fig. 9, the switch 69 controls the energization of a solenoid 74 of the solenoid operated valve 75. This valve controls the communication between a supply of air under pressure connected with supply conduit 76 and a conduit 77 communicating with the passage 45 in member 44, a sectional view of which is illustrated in detail in Fig. 2. Passage 45 communicates with the interior of the cathode ray tube envelope through the tubular members 39 and 29.

In order to insure uniform heating of the cathode ray tube envelope in stations IV to XI inclusive, provision is made for rotating the heads or work holders 9 in these positions. To this end a chain 78 is positioned to engage the sprockets 20 of each of the rotatable heads 9 as they occupy stations IV to XII inclusive. The chain is driven by a sprocket 79 driven by a suitable motor 80 through a gear reduction 81. The chain is driven around idling sprockets 82 and 83 which are positioned to support the chain in suitable relation with respect to the sprockets 20 as they occupy the various stations.

A generally annular oven designated by the numeral 84 is supported above the table 1 of the machine and encloses the heads 9 as they occupy stations XIII to XXIV inclusive. The temperature in the oven is suitably controlled to effect the desired cooling of the envelope assemblies and annealing of the glass.

The pneumatic and electrical system for controlling the position of the ring burners 64 and 65 will now be described. As illustrated in Fig. 1, the support rods 66 and 67 are guided for vertical movement in a pair of guide sleeves 84 and 85 carried on a suitable fixed supporting plate 86. The rods 66 and 67 are connected together by a cross-head 87 which is supported from a piston rod 88 terminating in a piston 89 within a cylinder 90. The position of piston 89 is controlled by the selective admission of air or other gas under pressure to one or the other sides of the piston through conduits 91 and 92 from a supply conduit 93, under the control of a two-position, four-way valve designated by the numeral 94 and including an operating solenoid 95. The valve is also provided with an exhaust conduit 96 which is connected with the conduit 91 when the valve 94 is in a position to connect the conduit 92 with the supply conduit 93. The moveable part of the valve 94 is biased to this position so that in the absence of energization of operating solenoid 95 the piston 89 and burners 64 and 65 are moved upwardly. When the valve is moved to its other position by energization of the solenoid 95, the connections are reversed so that air under pressure is supplied from the conduit 93 through the conduit 91 and the conduit 92 is connected to the exhaust conduit 6. In this manner it is necessary to energize the solenoid 95 to move the piston 89 and as a result the ring burners 64 and 65 downward to the position shown.

In order to provide a mechanical interlock which prevents the burners from returning to a lowered position in the event that air pressure fails, there is provided a mechanical stop member 97 which is biased to the left by means of a spring 98 positioned behind an air operated piston 99 which is connected to the member 97 by the piston rod 100. In the absence of air under pressure piston 100. In the absence of air under pressure on the left-hand side of the piston 99, the interlocking plate 97 prevents the support rod 67 from moving downwardly. The piston is controlled pneumatically by means of air from a supply conduit 101 which is selectively admitted to either side of the piston 99 through conduits 102 and 103 connected to opposite ends of the cylinder 104 by means of a valve 105 in a manner similar to that described in connection with valve 94. The valve includes an operating solenoid 106 and when this solenoid is de-energized, the valve is biased to a position in which the conduit 101 communicates with the conduit 103 to urge the piston and interlocking member 97 to the left. In this position conduit 102 is connected through the valve to an exhaust conduit. When the solenoid 106 is energized and air pressure is available at conduit 101, the valve is operated to connect supply conduit 101 with conduit 102 and conduit 103 with exhaust conduit 107 and move the piston 98 and the interlocking member 97 to the right. It will be apparent that this mechanical interlock prevents lowering of the ring burners when air pressure is not available.

A further interlock dependent upon the position of the ring burners is provided by a pair of switches 108 and 109 each having an operating member 110 respectively engaging opposite sides of one of the burner operating rods 66. These switches are arranged in vertically displaced positions so that when the burners are fully raised the operating member 110A of switch 108 is moved to the right by a cam surface 111 and the operating member 110B of switch 109 drops off the end of the rod 66 and also moves to the right. The function and operation of these switches will become more apparent from a detailed consideration of the control system shown in Fig. 9.

Referring now to the control system as shown in Fig. 9, electric power for the driving motors and for the control system is furnished by a three phase supply circuit 112. The indexing motor 3 is connected to the circuit 112 through the normally open contacts of relay 113 having an operating coil 114 and through a line switch 115. The motor 80, which rotates the heads 9, is energized by a single phase supply line 116 energized from one phase of the supply circuit 112 through the line switch 115 and a step-down transformer 117. Power for the control circuit is derived from a control bus including conductors 118 and 119 energized from the single phase circuit 116 through a double pole starting switch 120. The starting switch 120 controls the overall apparatus and thus comprises a common electrical means for activating or enabling the operation of all of the individual electrical controls included in the apparatus.

The period between indexing of the movable part of the machine or the period of "dwell" is controlled by a timing relay 140 including a continuously energized constant speed motor 121 connected to the control bus 118, 119, which is controllably connected to the operating mechanism for a normally open contact 122 by means of a solenoid including an operating winding 123 and the clutch 124. When the clutch members are engaged the motor 121 drives the movable contact 122 towards closed position and effects closure a predetermined time after the solenoid 123 is energized dependent upon the setting of the relay 140. Relays of this type are well known in the art.

During the "dwell" period, the operating solenoid 95 of the four way valve 94 is energized from the control bus 118, 119 through a circuit including the normally closed contact 125 of a relay 126 and the normally closed contact 127 of switch 8. As indicated in connection with the description of the four way valve 94 when the solenoid 95 is energized the air supply conduit 93 is connected with conduit 91 to admit air to the upper side of piston 89 and the conduit 92 is connected with the exhaust conduit 95. This forces the piston to the lower position indicated in Fig. 1 and the supporting rod 66 is in the lower position as indicated in Figs. 1 and 9. This maintains the contacts of switches 108 and 109 in the open position to prevent energization of the operating coil 114 of relay 113 connected in the supply circuit of the indexing motor to maintain the indexing motor de-energized. At the end of the "dwell" period during which the contact 122 is moved toward closed position by the timing motor 121 the table 1 of the machine remains stationary. As soon as contact 122 is moved to the closed position a circuit for the operating coil 128 of relay 126 is energized from the control bus 118, 119. This opens contact 125 and opens the circuit of solenoid 95 of the solenoid valve 94 to reverse the communication between the ends of the cylinder 90 and the supply and exhaust conduits 93 and 95 as shown in Fig. 1 to move the ring burners upwardly. As the burners reach their upper position, switches 108 and 109 are closed to complete a circuit for energizing the coil 114 of the indexing motor relay 113 to effect energization of the indexing motor 3. As soon as the indexing motor is energized actual movement of the table 1 is initiated and cams 5 and 6 start to rotate. As cam 5 rotates in the clockwise direction the actuator 129 of the switch 7 rides off the cam surface 130 to open the normally closed contacts 131 and close the normally open contacts 132 of the switch 7. Opening of contacts 131 deenergizes the coil 123 of the timer 124. Also at the initiation of the indexing motion cam 6 rotates and the cam surface 133 thereof forces the actuator 134 of switch 8 downwardly to open the contact 127. The length of the cam surface 133 corresponds to a period of time slightly greater than that required for the actual movement of the table 1 of the total indexing period, which for the 24 head machine illustrated is approximately one fourth of the total time required for the indexing motor to drive all of the parts of the indexing mechanism back to their initial position ready for another indexing period. The circuits controlled by operation of the cams 5 and 6 are for the purpose of lowering the ring burners during this latter portion of the indexing period when the motor 3 needs to be energized for resetting the indexing mechanism but after the actual movement of the table has been completed. It is seen that as contact 132 is closed a circuit from conductor 118 through the coil 114 of the indexing motor control relay, to the conductor 119 to maintain the indexing motor energized independently of the interlocking switches 108 and 109. The ring burner, however, is maintained in its upper position for the period of actual movement of the table 1 by cam surface 133 of cam 6 which prevents energization of coil 95 during that period. After relay 126 has been de-energized by opening of contact 122 and the cam 6 has rotated to the point where the actuator 134 rides off of the cam surface 133, a circuit from between supply conductors 118 and 119 is completed for operating the solenoid valve 95 while the energization of the indexing motor continues for the purpose of restoring the parts of the indexing system to their reset or initial position. As the cams continue to rotate, the actuator 129 of switch 7 rides upon the cam surface 130 to open contacts 132 of the control circuit for the indexing motor terminating the total indexing period during which the indexing motor is energized and closing contacts 131 to complete circuit to energizing operating winding 123 of timer 124. The length of cam surface 133 therefore, provides means for preventing movement of the ring burners downwardly for a period at least equal to the period of actual movement of the table 1.

The control system has thus completed a complete cycle of operation and the timer motor is again clutched to the contact driving mechanism for contact 122 and the timing of the next "dwell" period is initiated.

It is desirable in some instances to be able to take manual control of the timing of the "dwell" period and to this end a normally closed push button 136 is provided in circuit with the coil 123 of the timing relay and a normally open push button 137 is connected in shunt with the timing contact 122. By opening switch 136, it is possible to interrupt the timing operation and in this way extend the "dwell" period at the wishes of the operator. When it is desired to terminate the timing period independently of the timer, it is apparent that closure of switch 137 is equivalent to the closing of contact 122 by the timer and effectively times out the "dwell" period.

Also shown on Fig. 9 is the operating coil 74 of the solenoid valve 75 which operates to admit air to the interior of the tube envelope in station XII. It is apparent from an inspection of Fig. 1 and Fig. 9 that as the face plate 23 moves upwardly a predetermined amount; the switch 69 opens to de-energize the coil 75 to shut off the supply of air. If the face plate sags, the switch is closed to operate the valve to the open position to admit additional air. Thus, as long as the face plate continues to sag, air is intermittently admitted to keep the plate in a predetermined position.

The operating coil 106 of solenoid valve 105 is connected directly with the control bus 118, 119 to energize the solenoid and operate the four way valve to admit air to the left-hand side of the piston 99 and withdraw the mechanical interlock whenever air under pressure is available and switches 115 and 120 are closed. If either the electrical system is de-energized or there is a lack of air pressure, it will be apparent that the interlock prevents lowering of the ring burners and thereby locks out the entire system.

From the foregoing detailed description it is believed that the operation of the machine in general will be readily understood. It is believed desirable, however, to describe briefly the manner in which the parts are loaded and the manner in which the position of the parts is controlled during the sealing operations. After the machine has been in operation, it is apparent that the completed envelopes will emerge from the oven at position I and the operator removes the completed tube envelope and places the cone 21, the neck 22 and the plate 23 in position as shown in Fig. 7. The operator has the three stations, I, II and III available to complete these unloading and loading operations. When loading the parts, the operator adjusts the nut 35 until the upper end of the flare of the neck 22 is in contact with the lower end of the cone 21 as shown in Fig. 7. This is done with the cam actuating surface 52 in the position shown in Fig. 3 of the drawing to depress the support 30 for the tube neck against the action of the spring 37. After the adjustment is made, the operator rotates the cam actuator 48, including the surface 52 to the outer edge of the cam surface 46 which allows the support for the tube neck 22 to move upwardly under the action of the spring as the glass is softened by an amount equal to the lift of the cam surface between the inner and outer positions of the surface 52. As the machine indexes into station IX with the work holders rotating, it will be apparent that the stop 62 strikes the projection 51 of the cam actuator to move the cam actuating surface 52 back to the inner position. This depresses the support 30 for the neck of the tube by the same amount that the glass was pushed up during the sealing. Having lowered the support including the support member 30 by this amount the tube is allowed to settle or pull down under the weight of the glass neck to smooth out the glass at the seal. It is apparent that this construction of the head provides an automatic pushup and pull down of a predetermined amount which insures a good seal with the glass without an undesirable thickening of the glass at the seal. It also incorporates the necessary adjustment for compensating for variation in the length of the glass necks 22.

As will be readily appreciated, the ring burners are elevated each time the machine is indexed and are lowered as soon as the movable part of the machine comes to rest. The provision of the cams 5 and 6 and associated control switches 7 and 8 permits the burners to be depressed as soon as the machine comes to rest even though the indexing motor is energized for a period of time sufficient to return all the parts of the indexing mechanism to their reset or initial position. This control, therefore, permits a faster indexing since the total heating time by the ring burners is equal to the "dwell" period plus the portion of the indexing period requiring to reset the indexing mechanism after actual movement of the table is terminated.

While we have described and claimed a particular embodiment of our invention, it will be apparent to those skilled in the art that many changes and modifications may be made without departing from our invention in its broader aspect and we aim, therefore, in the appended claims to cover all such changes and modifications as fall within the true spirit and scope of our invention.

What we claim as new and desire to secure by Letters Patent of the United States is:

1. A machine for sealing a face plate and glass neck to a metal cone comprising a movable support, a plurality of work holders mounted in spaced relation on said support, each of said work holders including means for supporting the neck, cone and face plate of a cathode ray tube envelope in sealing relation, means for intermittently moving said movable support to bring each of said work holders in cooperative relation to a plurality of work stations in succession, one of said work stations including means for directly heating both ends of a cone received in one of said holders, a second work station including means for sealing a neck to a cone while continuing the direct heating of the upper end of the cone, a third station including means for heating only the upper edge of the cone and the face plate to sealing temperature, and a fourth station including means for admitting air to the interior of a cone after the neck and face plate seals have been made including a solenoid valve and switch means responsive to the sag of a face plate at said fourth station for controlling the admission of air.

2. A work support for the metal and glass parts of a cathode ray tube comprising a cone support, a glass support, said supports being splined together to rotate as a unit but to move vertically relative to one another, spring means for urging said supports to move relatively in one direction, a cam carried by said glass support, means including a pivotally mounted cam actuator supported in vertically fixed relation for cooperating with said cam and maintaining said supports in controlled vertical position in relation to one another, means for adjusting said glass support vertically with respect to said cone support to compensate for variations in dimensions in the metal and glass parts and means for pivotally positioning said cam actuator to effect a controlled change in the relative positions of said supports as a result of relative movement produced by said spring means.

3. A work support for the metal and glass parts of a cathode ray tube comprising a cone support, a neck support, spring means for urging said supports to move vertically and relatively in one direction, a cam carried by said neck support, a cam actuator pivotally mounted in vertically fixed relation with respect to said supports to maintain said supports in a controlled relative vertical position with respect to one another, and means for pivotally positioning said cam actuator to effect a controlled change in the relative positions of said supports as a result of relative movement produced by said spring means.

4. Apparatus for fabricating a composite glass and metal device including a work support for metal and glass parts comprising a support for the metal part, a support for the glass part, said supports being splined together to rotate as a unit but to move vertically relative to one another, spring means for urging said supports to move relatively in one direction, a cam carried by said support for said glass part, means including a cam actuator pivotally mounted in vertically fixed relation with respect to said supports to maintain said supports in a controlled relative vertical position, a moveable support for said work support, means for moving said moveable support into successive work stations and means at one of said stations for rendering said cam actuator operative to effect a controlled change in the relative positions of said supports.

5. Apparatus for supporting a metal cone and a glass neck in co-operative relation for sealing the two together comprising a cone support for the metal cone, a neck support for positioning the glass neck in sealing relation to the smaller end of said cone and having a definite but adjustable position with respect to the support for said cone including threaded means for adjusting the position of said neck support with respect to the cone support, spring means interposed between said supports and urging said neck support toward said cone support, cam means for retaining said neck support against the bias of said spring means and operative to release said neck support for controlled movement of said neck support by said spring means, said cam means being movable to return said support to an initial position to depress said neck support to allow a neck supported thereby to settle after it has been sealed to the metal cone.

6. A machine for sealing a face plate to a metal cone of the type having a flange for supporting the face plate prior to sealing including means for supporting the cone in an upright position with the larger end opening upwardly to receive a face plate, gas supply means communicating with the interior of a cone on said support for introducing gas within a cone on said support and switch means responsive to the vertical position of a face plate on a cone in said support, said switch means actuating said supply means for controlling the admission of gas through said supply means to the interior of a cathode ray tube envelope for maintaining such a face plate in a controlled position during the cooling of the cone and face plate.

7. A machine for sealing the face plate and neck to a metal cone including a movable support, a work holder carried by said support including a cone support for holding a metal cone with its axis vertical and the larger end thereof upward and a support for holding a glass neck in sealing relation to the lower end of a cone so supported, said last mentioned support including a hollow tubular member extending through said movable support, means cooperating with the lower end of said tubular member in one position of said movable support for admitting gas under pressure to said tubular member, a solenoid valve and means including a switch responsive to the position of a face plate sealed to the upper end of a cone carried by said cone support for controlling the admission of air under pressure to said tubular member.

8. Apparatus for sealing together a vitreous neck portion and a metallic conical portion of a cathode-ray tube envelope including: a supporting table; a vertically extending lift tube; a vertically extending air tube mounted coaxially with said lift tube and extending upwardly beyond the extremity of said lift tube; an adjustable mechanism for varying the axial position of said air tube relative to said lift tube; means associated with said adjustable mechanism for securing said air tube and lift tube in a selected relative axial position; a first supporting structure for supporting said conical portion in a vertical position with its large end upward; a second supporting structure secured to said air tube for supporting said neck portion coaxially with said conical portion but initially spaced below the lower small end of said conical portion a distance determined by the setting of said adjustable mechanism; and a lifting mechanism mechanically coupled to said lift tube for raising said neck portion into contact with the lower end of said conical portion.

9. Apparatus for sealing together a vitreous neck portion and a metallic conical portion of a cathode-ray tube envelope including: a supporting table; a vertically extending drive tube rotatably supported by said table; a driving mechanism mechanically coupled to said drive tube for imparting rotational motion thereto; a vertically extending lift tube slidably mounted coaxially with said drive tube for rotation therewith and extending upwardly beyond the extremity of said drive tube; a vertically extending air tube mounted coaxially with said lift tube for rotation therewith and extending upwardly beyond the extremity of said lift tube; an adjustable mechanism for varying the axial position of said air tube relative to said lift tube; means associated with said adjustable mechanism for securing said air tube and lift tube in a selected relative axial position; a first supporting structure secured to said drive tube for supporting said conical portion in a vertical position with its large end upward; a second supporting structure secured to said air tube for supporting said neck portion coaxially with said conical portion initially adjacent the lower small end of said conical portion; and a lifting mechanism mechanically coupled to said lift tube for raising said neck portion into sealing contact with the lower end of said conical portion.

10. Apparatus for sealing a glass face plate to the rim of a metal cone to which a glass neck has been previously sealed, said apparatus including a rotatable turret having a plurality of cradles, each cradle having means for holding a metal cone in an upright position, and a hollow rotatable spindle upon which said glass neck may be seated, means for rotating said turret intermittently through a series of working positions, a gas burner at one of said positions, said burner being capable of being moved into a position proximate said rim of said cone only when said cradle is at rest in one of said working positions and out of the path of travel of said cone when said turret rotates between working positions, an electrical control for moving said burner, an air valve at one of said working positions, said air valve being in register with the hollow of said spindle when said cradle is in said last-mentioned one of said working positions, means for introducing a regulated blast of air through said valve and said hollow spindle and into said cone, an electrical control for starting and stopping said air blast, and a common electrical synchronizing control for activating said electrical control for moving said burner and said electrical control for starting and stopping said air blast.

11. Apparatus for sealing face plates to envelope members comprising a movable support structure having a plurality of envelope member supporting heads each including an air passage to the interior of an envelope member supported thereby, means for actuating said support structure for successively positioning said heads at a plurality of work stations, heating means at one of said stations, means for moving said heating means into an operative position proximate the rim of an envelope member when said support structure is at rest and out of said operative position when said support structure is moving, an electrical control for said means for moving said heating means, an air valve at one of said work stations adapted for registering with the air passage of a head moved into said last-mentioned one of said work stations and admitting compressed air into the envelope member supported by said head, an electrical control for determining the operation of said air valve, and a common electrical means for activating said electrical controls.

12. Apparatus for sealing a face plate to a tube comprising means for supporting said tube during said sealing operation, said means for supporting having an air passage admitting to the interior of said tube, a source of regulated air pressure connecting to said air passage, electrical means for controlling air admitted to said passage from said source, heating means for heating said tube and said face plate in the region of said seal, means for moving said heating means between a position proximate to and a position remote from said tube, electrical means for controlling said means for moving said heating means, and a common electrical means for activating said electrical means for controlling air admitted to said passage and said electrical means for controlling said means for moving said heating means.

13. Apparatus for sealing a face plate to an envelope member comprising means for supporting said member during a sealing operation, said means for supporting including an air passage to the interior of a member supported thereby, valve means associated with said passage and adapted for admitting compressed air into said member, electrical means controlling the operation of said valve means, heating means for heating said member and face plate in the region of a desired seal, means for moving said heating means between operative and inoperative positions, electrical means for controlling said means for moving said heating means, and a common electrical means for activating said electrical means controlling the operation of said valve means and said electrical means for controlling said means for moving said heating means.

References Cited in the file of this patent
UNITED STATES PATENTS

| | | |
|---|---|---|
| 2,063,235 | Eisler | Dec. 8, 1936 |
| 2,237,186 | Malloy | Apr. 1, 1941 |
| 2,296,307 | Power | Sept. 22, 1942 |
| 2,334,123 | Perkins | Nov. 9, 1943 |
| 2,335,617 | Thomas et al. | Nov. 30, 1943 |
| 2,447,158 | Cartun | Aug. 17, 1948 |
| 3,455,317 | Schneider | Nov. 30, 1948 |
| 2,715,298 | Buttino | Aug. 16, 1955 |